C. H. KENDALL.
Carriage-Axle.

No. 212,387. Patented Feb. 18, 1879.

Witnesses.
N. E. Whitney
L. F. Connor

Inventor.
Charles H. Kendall,
by Crosby & Gregory, Attys

UNITED STATES PATENT OFFICE.

CHARLES H. KENDALL, OF BOSTON, MASSACHUSETTS, ASSIGNOR TO BENJAMIN S. PRAY, OF SAME PLACE.

IMPROVEMENT IN CARRIAGE-AXLES.

Specification forming part of Letters Patent No. 212,387, dated February 18, 1879; application filed December 2, 1878.

*To all whom it may concern:*

Be it known that I, CHARLES H. KENDALL, of Boston, county of Suffolk, State of Massachusetts, have invented an Improvement in Carriage-Axles, of which the following description, in connection with the accompanying drawings, is a specification.

This invention relates to an improvement in carriage-axles of that class in which it is aimed to prevent end-thrust of the axle-box against a fixed portion of the axle or nut when the wheel meets a stone or rolls over a rough road.

My invention is shown embodied in an axle and wheel of the class wherein the wheel can be taken from the axle only by removing a sleeve or cap at the rear end of the hub and axle-box, the said sleeve or cap holding a spring at the rear of the collar of the axle, while a portion of the axle in advance of the collar is operated upon by a spring held at the forward end of the axle-box and hub, the tendency of which is to check the wheel from moving too far backward upon the axle or toward its center.

Figure 1:
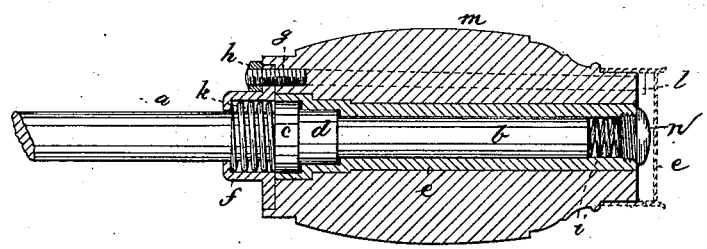
Figure 2:
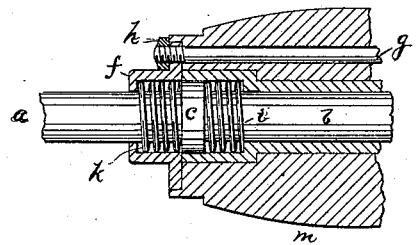

Figure 1 represents, in longitudinal section, a hub and axle-box, with the axle and spring in elevation; and Fig. 2, a modification.

The axle $a$ has an arm, $b$, provided with a collar, $c$, and a portion, $d$, in front of it of greater diameter than the main portion of the arm. The hub $m$ is suitably bored to receive a metal box, $e$, chambered to receive and fit the axle-arm and collar. At the rear of the hub and box is a sleeve or cap, $f$, shown as held in fixed position with relation to the hub and box by a bolt, $g$, and nut $h$. This bolt, in practice, will, preferably, be extended through to the front of the hub, against which its head will rest, as shown in dotted lines, and three bolts will be so used, all as now commonly practiced with three-bolt axles.

To take the wheel from a three-bolt axle the nuts at the rear of the hub are removed.

The sleeve contains a spring, $h$, which is held at one end by a shoulder within the sleeve, and the other end of the spring bears against the rear side of the collar.

As shown in Fig. 1, the end of the arm $b$, cut off so as to terminate short of the end of the box, is acted upon by a spring, $i$, held within the end of the box by a nut, $n$, screwed into the box; or the spring might be held in a box having a solid end.

The outer end of the hub and box will usually be covered by a full cap or shell, $l$. (Shown in dotted lines.)

It is obvious that the spring $i$, instead of being placed at the extreme outer end of the box, might be placed at the front side of the collar, as shown in Fig. 2, the box being chambered for a short distance opposite the portion $d$ of the arm, so as to receive the said spring and form a shoulder, against which the end of the spring nearest the end of the axle and front of the hub may bear, as shown in Fig. 2.

It is obvious that the sleeve, instead of being attached to the hub by the bolts shown in Fig. 1, may be attached to the rear portion of the box by suitable screw-threads cut on each.

The collar will be made separate from the axle, and be screwed or otherwise secured upon its arm.

I claim—

A box and a sleeve or cap at its rear end, to move with the box, and an axle provided with a collar, $c$, combined with a spring placed about the axle at the rear of the collar, and between the collar and the sleeve or cap at the rear of the box, and a spring located in front of the collar, the latter spring bearing at its inner end against a fixed part of the axle, and at its outer end against a surface which is moved in unison with the box and hub, the said springs operating to cushion the box and axle, and prevent jar whatever may be the direction of the movement of the box and hub laterally with relation to the axle.

In testimony whereof I have signed my name to this specification in the presence of two subscribing witnesses.

CHARLES H. KENDALL.

Witnesses:
G. W. GREGORY,
N. E. WHITNEY.